Jan. 29, 1957   C. W. CAIRNES ET AL   2,779,464
SHOCK MOUNT FOR CONTAINERS

Filed Dec. 8, 1953   3 Sheets-Sheet 1

CHARLES W. CAIRNES
ODIN R. S. ELNAN
*INVENTOR.*

BY Billy J. Corlew

CHARLES W. CAIRNES
ODIN R. S. ELNAN
*INVENTOR.*

Jan. 29, 1957 C. W. CAIRNES ET AL 2,779,464
SHOCK MOUNT FOR CONTAINERS
Filed Dec. 8, 1953 3 Sheets-Sheet 3

CHARLES W. CAIRNES
ODIN R. S. ELNAN
INVENTOR.

BY *Billy G. Corber*

United States Patent Office 2,779,464
Patented Jan. 29, 1957

2,779,464

SHOCK MOUNT FOR CONTAINERS

Charles W. Cairnes and Odin R. S. Elnan, Baltimore, Md., assignors to Aircraft Armaments, Inc., Baltimore, Md., a corporation of Maryland Application December 8, 1953, Serial No. 396,939

6 Claims. (Cl. 206—46)

This invention relates generally to shock mounts and more particularly to a shock mount for supporting a fragile object within a container of limited size. Briefly stated, the shock mount prevents relative movement between the object and the container until a shock load is applied to the container which exceeds the predetermined maximum allowable shock load on the object and then permits only such movement as is required to prevent damaging the object.

Conventional containers for shipping fragile objects are required to be much larger than the objects which are carried due to the type of suspension system employed for absorbing the shock loads. Relative movement between the object and the container is allowed for even the slightest shock load and, as a result, in order to prevent damage to the object by large shock loads, provisions allowing for considerable movement must be made. The large size of the container relative to the size of the object not only increases the handling costs but also, due to the space reqired, makes it highly impractical to ship large articles in this manner by any transportation means where space is at a premium such as on aircraft.

Another obvious limitation or defficiency in conventional shock mounts such as those used in containers, and the like, is that they provide very poor vibration damping characteristics. Direct spring mounting without pre-load allows spring movement in response to even the slightest force. As a result, vibrations, even though small, if at the resonant frequency of the spring will build up and apply damaging loads on the object so mounted. However, with the pre-loaded shock mount described herein, vibrations are damped out and are not allowed to build up in the springs since the springs are restrained against movement until a certain predetermined accelerating load is applied to the object.

An object of this invention is to provide a container having shock mounting means for supporting an object within the container which will effectively shield the object from damaging shock loads applied to the container and allow relative movement between the object and the container only in response to shock loads exceeding a predetermined maximum value.

Another object of this invention is to provide a method of shock mounting an object which will allow its being mounted within a space only slightly larger than the object itself.

Another object of this invention is to provide a shock mount which will not only efficiently absorb shock loads but also will effectively serve as a vibration damper.

Still another object of this invention is to provide a shock mount which is dependable in operation and which will function properly over a long period of time without maintenance.

Further and other objects will become apparent from a reading of the following description especially when considered together with the accompanying drawings wherein like numerals refer to like parts.

Figure 1:
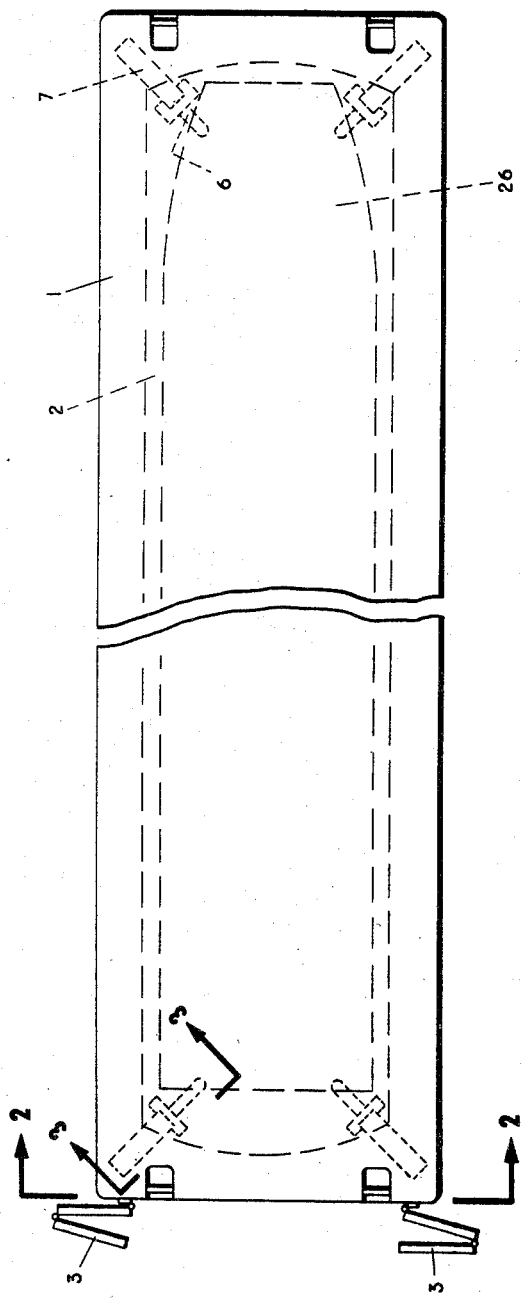
Fig. 1 is a top view of a container embodying the shock mount of this invention.
Figure 2:
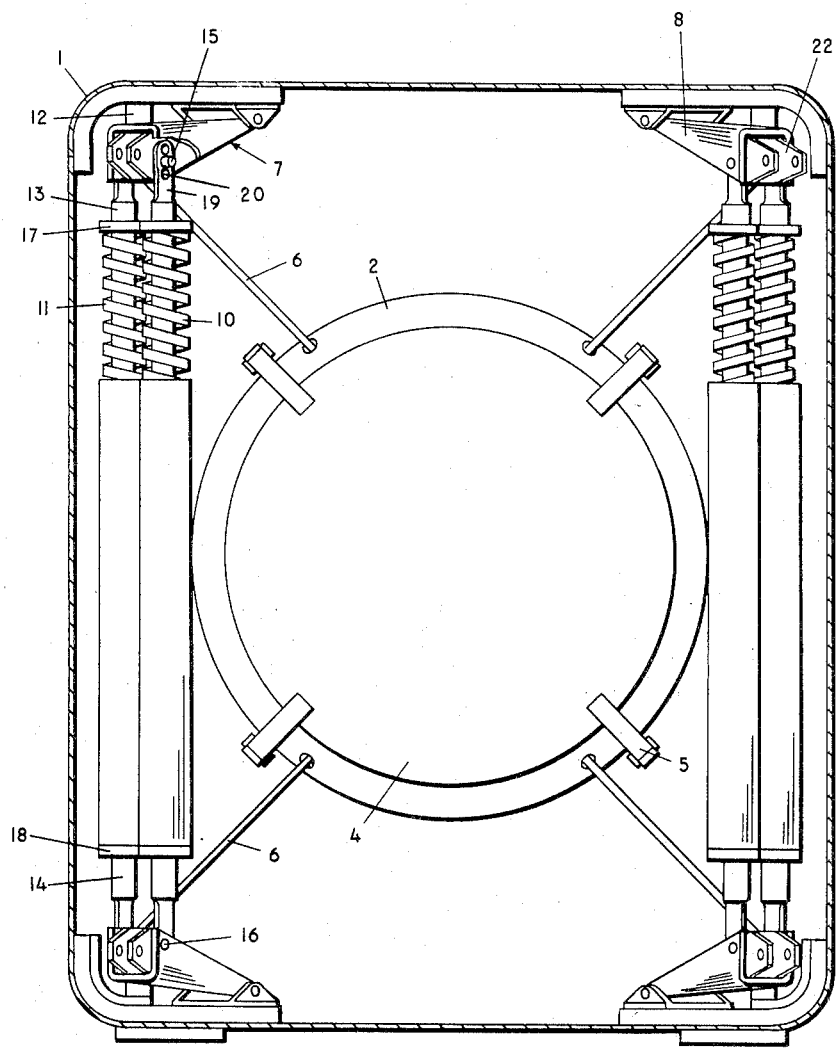
Fig. 2 is a sectional view taken approximately on line 2—2 of Fig. 1 with the snubbers omitted for clarity.

The container as shown in Figures 1 and 2 is a generally rectangular, box-like structure having a reinforced frame 1 forming a stiff outer container or housing, around an inner container 2. Suitable doors 3 are swingably carried by frame 1 at one end thereof for gaining access to the inner container. An end wall 4 of inner container 2 is removably secured to the container side wall by suitable latch means 5 to provide an opening for loading and unloading the container.

Inner container 2 is suspended within the confines of frame 1 by a plurality of links or cables 6 which connect with shock mounts 7 secured to the frame. Two pairs of opposed mounts 7 are provided at each end of frame 1 as indicated in Figures 1 and 2 to restrain the movement of inner container 2 in all directions. The shock loads applied to frame 1 by dropping, or the like, are absorbed by the shock mounts to prevent damaging the object carried within the inner container.

Figure 3:
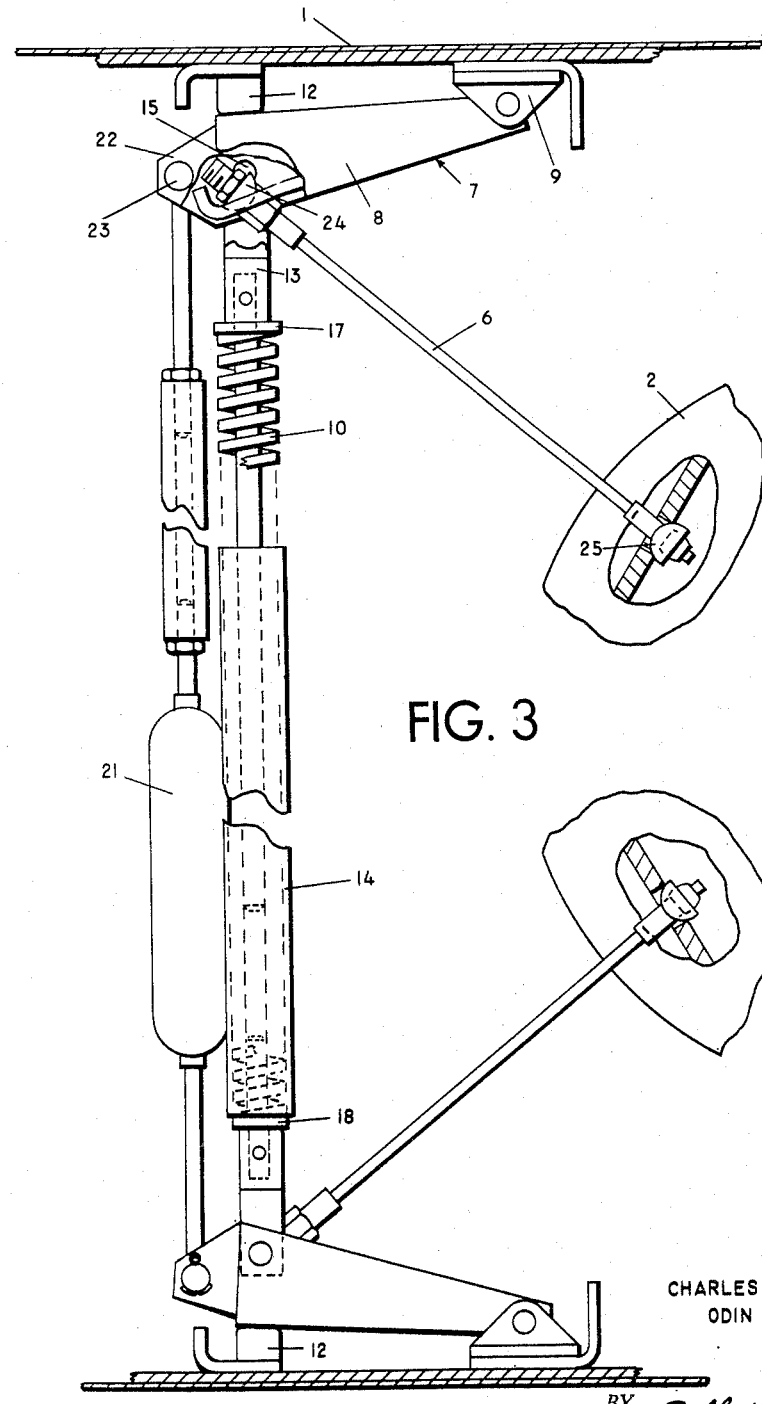
Fig. 3 is a sectional view taken approximately on line 3—3 of Fig. 1.

As shown in Figures 2 and 3, each shock mount 7 includes a lever 8 which is swingably carried by a bracket 9 secured to frame 1. A pair of compression springs 10 and 11, interposed between the levers of each pair of opposed mounts, urge the levers of the associated shock mounts into an extreme position engaging abutments 12 on frame 1. Springs 10 and 11 are each supported and guided by a pair of telescoping members 13 and 14 concentrically arranged relative to the spring. Member 13 connects with one of the pair of levers 8 through pin 15, and member 14 connects with the other of the pair of levers through pin 16, so that telecoping movement of members 13 and 14 is brought about by swinging motion of either of the opposed pair of levers. Springs 10 and 11 act between flanges 17 and 18 on the associated telescoping members 13 and 14.

The ends 19 of members 13 and 14 are provided with a plurality of holes 20, as best shown in Figure 2, for engaging pins 15 and 16 which connect the members with levers 8. The pre-load on the springs may be adjusted by simply connecting the members 13 and 14 with pins 15 and 16 through the desired holes 20. Spring pre-load may also be varied by changing the height of abutments 12.

Return movement of levers 8 back to the extreme position engaging abutments 12 is regulated by a suitable single action snubber 21, as best shown in Figure 3. This snubber should be of the constant force type so that the return movement velocity will decrease in response to the decrease in spring force as the levers 8 approach abutments 12. Snubber 21 is arranged generally parallel with springs 10 and 11 and connects with lever extensions 22 through suitable pin connections 23 on opposed mounts 7.

As most clearly indicated in Figure 1, each mount 7 is arranged such that cable 6 lies in the same plane as the plane of movement of lever 8. By so arranging the mount, side loads on the lever is substantially eliminated for all conditions except when a load is applied to the frame in an endwise direction. Cable 6 of each mount engages lever 8 for support through a ball-and-socket connection 24 located approximately on the axis of pins 15 or 16. The opposite end of cable 6 supportingly engages inner container 2 through a similar ball-and-socket connection 25 arranged relative to the mount so that cable 6 extends from lever 8 in the plane of the movement, at an angle which will vary, as lever 8 is moved from the extreme position due to the application of shock loads, to increase the mechanical advantage of the linkage at substantially the same rate as the spring force increases whereby a substantially constant force applied by the inner container will counterbalance the force exerted by the springs. The magnitude of the angle which cable 6 should make with lever 8 when the lever is in the extreme position engaging abutment 12 obviously depends upon the type of spring employed, the direction of the spring force relative to the lever, and also upon the direction of movement of container 2 in response to a shock load. This optimum angle may be readily determined for a particular arrangement of components by conventional mathematical analysis.

The spring pre-loading on the mounts is set at a value sufficient to support the container and the object carried therein without deflecting upon the application of a shock load which is almost equal to but slightly less than the maximum allowable shock load which can be applied without causing damage to the object. That is, a shock load applied to frame 1, such as by dropping, will cause swinging movement of levers 8 only if such movement is necessary to prevent the inner container from exceeding a certain predetermined maximum acceleration.

Pre-loading the springs to prevent movement of levers 8 until a damaging shock load is applied not only materially reduces the space required for shock mounting the object, but also eliminates vibration difficulties.

The method of using the container and the manner in which the mounts operate to limit the accelerations or "g" loading on the object in the container is believed obvious from a reading of the foregoing description. A fragile object such as missile 26, shown in dotted lines in Figure 1, is moved into container 2 through the openings provided by removing doors 3 on frame 1 and end wall 4 on the inner container. The object is then suitably rigidly mounted in the inner container and the openings are closed by replacing end wall 4 and doors 3. With the object protected inside the inner container, the complete assembly may be handled in the same manner as any other shipping or storage container. Shock loads applied to the outer container or frame 1 are transmitted to the inner container through mounts 7. When a shock load is applied to frame 1 which trys to accelerate the inner container beyond the predetermined maximum "g" loading, springs 10 and 11 are compressed as required to absorb the excess energy and prevent damage. At the end of the compression stroke, the energy in the springs urges levers 8 back to the extreme position engaging abutments 12. Snubbers 21 resist the return movement with a constant force causing the velocity of the return movement to decrease as the spring force decreases. Because the springs are pre-loaded and because the mechanical advange decreases during the return stroke, this restraint by the snubber is necessary to prevent levers 8 from violently striking abutments 12 and setting up reaction shock loads in the mounts.

Since a nearly constant force applied by the inner container will counterbalance the spring force throughout the movement of the mounts, the springs may be safely pre-loaded to an amount which will prevent movement of the inner container until the maximum allowable accelerating force is applied thereto. For example, if the object carried by the inner container can withstand an acceleration equal to ten times the pull of gravity (10 "g's"), the springs may be pre-loaded to prevent movement until the inner container is subjected to a 10 "g" acceleration. The varying mechanical advantage afforded by the linkage arrangement will not allow the mount to exert a force on the inner container which will produce an acceleration greater than that established by the spring pre-load. As a result, only such movement as is absolutely necessary to prevent exceeding the maximum allowable "g" loading occurs. A shock load of any magnitude may be applied to frame 1 without damaging the inner container so long as the energy imparted to the springs is less than the energy required to fully compress them.

The inner and outer container arrangement described hereinabove provides an efficient structure from a weight-saving standpoint where it is desired to both shock mount an object and also protect it against changes in air density and moisture. The inner container may be designed specifically as a pressure vessel while the outer container may be designed to efficiently withstand exteriorly applied impact loads. Obviously, where the only requirement is to shock mount the object, the inner container may be dispensed with by simply connecting the object directly to cables 6.

It is to be understood that certain alterations, modifications and substitutions may be made to the instant disclosure without departing from the teachings of this invention as defined in the appended claims.

We claim:

1. A container, comprising a frame forming an enclosure for receiving an object to be stored, a plurality of pairs of spring suspension means carried by said frame and connecting with the object for suspending the latter within said container, each said pair of suspension means having a pair of opposed levers pivotally attached at one end thereof to said frame at separate points thereon for independent movement inwardly with respect to said frame, from an extreme position to a position spaced from said extreme position, link means connected to said levers at a point spaced from the pivoted end thereof and extending between said opposed levers to pivotally connect with said object, and spring means interposed between said levers for urging the latter into said extreme position, so that swinging motion of said levers against the action of said spring will be effected by a force applied by the object through said link means, said spring means being pre-loaded to allow movement of said levers only in response to a shock load exceeding a certain predetermined value whereby movement of the object relative to the container occurs only when necessary to avoid excessive acceleration loads on said object.

2. A storage container, comprising a frame forming an enclosure adapted to receive an object to be stored, a plurality of spring suspension means carried by said frame and connecting with the object for suspending the latter within said container, each said suspension means including an arm swingably carried at one end by said frame at a separate point thereon, cable means carried by the free end of said arm and extending at an acute angle therewith to supportingly engage said object so that swinging motion of said arm toward said object will increase said angle between said arm and said cable means, spring means connecting with said arm adjacent the free end thereof for resisting movement of said arm due to forces applied by said cable means, and means for pre-loading said spring means to allow movement thereof only in response to forces applied by said object through said cable, which said forces exceed a certain predetermined value whereby movement of the object relative to the container occurs only when necessary to prevent damage.

3. A shipping container for fragile objects, comprising a frame forming an enclosure for receiving an object to be shipped, spring means carried by said frame, force transmitting means swingably carried by said frame and engaging said spring means for suspending said object within said container and allowing movement thereof in response to deflection of said spring means, and stop means carried by said frame for pre-loading said spring means to an extent sufficient to withstand shock loads providing less than the maximum allowable load on said object without deflecting, said force transmitting means including a lever pivoted at one end to said frame and normally forming an acute angle with the direction of forces transmitted to said force transmitting means from said object, thereby providing a mechanical advantage which increases with the increasing deflection of said spring means whereby a substantially constant sustaining force will be applied to said object by said spring means for all positions thereof.

4. A suspension system for shock mounting an object, comprising a supporting frame subjected to shock loads, a mechanical spring carried by said supporting frame, a lever swingably carried by said frame and engaging said spring, stop means carried by said frame for limiting the swinging movement of said lever and for pre-loading said spring, link means connecting with said lever for supporting said object, the axis of said link means lying along the direction of forces transmitted to said link from said object, said link means and said lever forming an acute angle therebetween so that said lever provides an increasing effective moment arm as said lever is rotated in a direction to increase the deflection of said spring whereby a substantially constant force on said link means will counterbalance the varying force exerted on said lever by said spring throughout the movement thereof, said spring being pre-loaded by said stop means an amount sufficient to overcome shock loads smaller than the maximum allowable load on said object without deflecting for reducing the space required to carry said object.

5. A storage container, comprising a frame forming an enclosure for receiving an object to be stored, a plurality of levers swingably carried by said frame, spring means connecting with each said lever and urging the latter into an extreme position pre-loading the spring means, link means pivotally connecting with each said lever and with the object to be stored for suspending said object within the frame enclosure, the axis of said link means coinciding with the direction of forces transmitted to said link from said object, said link means and said lever forming an acute angle therebetween so that said lever provides an increasing effective moment arm as said lever is rotated in a direction to increase the deflection of said spring so that said spring means may be actuated by a substantially constant force exerted by said object whereby said spring means may be deflected to move only in response to a predetermined maximum force generated by accelerating said object.

6. A shock mount comprising, a frame for receiving shock loads, a lever swingably carried by said frame for movement from an extreme position to a position spaced from said extreme position, spring means engaging the free end of said lever and urging the latter into said extreme position, means pre-loading said spring to allow movement of said lever from said extreme position only in response to a load of predetermined magnitude, and link means connecting with said lever for supporting an object, said link means forming an acute angle with said lever so that said lever provides an effective moment arm for forces directed along said link means, which effective moment arm increases with increasing deflection of said spring means whereby a substantial constant force applied to said link means by said object will counterbalance the force exerted by said spring means.

References Cited in the file of this patent

UNITED STATES PATENTS

| | | |
|---|---|---|
| 1,687,630 | McRar | Oct. 16, 1928 |
| 2,533,520 | Shimp | Dec. 12, 1950 |